(12) United States Patent  
Morimoto et al.

(10) Patent No.: US 9,035,214 B2  
(45) Date of Patent: May 19, 2015

(54) METHOD FOR CONNECTING LEADER LINE

(75) Inventors: Yasunori Morimoto, Tokyo (JP); Yoshiyuki Hatayama, Tokyo (JP)

(73) Assignee: Sumida Corporation, Tokyo (JP)

( * ) Notice: Subject to any disclaimer, the term of this patent is extended or adjusted under 35 U.S.C. 154(b) by 284 days.

(21) Appl. No.: 13/561,814

(22) Filed: Jul. 30, 2012

(65) Prior Publication Data

US 2013/0048616 A1 Feb. 28, 2013

(30) Foreign Application Priority Data

Aug. 29, 2011 (JP) .................................. 2011-186493

(51) Int. Cl.
*B23K 26/20* (2014.01)
*B23K 26/32* (2014.01)
*B23K 1/005* (2006.01)
*H01F 41/10* (2006.01)
*H01F 27/28* (2006.01)
*H01R 43/02* (2006.01)

(52) U.S. Cl.
CPC .............. *B23K 26/3293* (2013.01); *B23K 26/20* (2013.01); *B23K 26/3233* (2013.01); *B23K 2201/32* (2013.01); *B23K 2201/38* (2013.01); *H01F 27/2828* (2013.01); *B23K 1/0056* (2013.01); *B23K 2201/42* (2013.01); *B23K 2203/12* (2013.01); *H01F 41/10* (2013.01); *H01R 43/0221* (2013.01)

(58) Field of Classification Search
CPC ........... H01F 27/28; H01F 5/00; H01F 41/10; B23K 26/20
USPC ............ 336/200; 219/121.63–121.66, 121.85
See application file for complete search history.

(56) References Cited

U.S. PATENT DOCUMENTS 4,700,044 A * 10/1987 Hokanson et al. ....... 219/121.63
6,914,185 B2 * 7/2005 Ajiki .............................. 174/36

FOREIGN PATENT DOCUMENTS

| JP | 60-50881 A | 3/1985 |
| JP | A-3-155300 | 7/1991 |
| JP | 2001-047222 A | 2/2001 |

OTHER PUBLICATIONS

Feb. 3, 2015 Office Action issued in Japanese Patent Application No. 2011-186493.

* cited by examiner

*Primary Examiner* — Samuel M Heinrich  
(74) *Attorney, Agent, or Firm* — Oliff PLC

(57) ABSTRACT

Disclosed is a method for connecting a core wire of a wire rod covered with an insulating coating and pulled out from a coil component with a substrate by irradiating a laser beam, the method comprising the steps of: (a) forming a bond part between the wire rod and the substrate, the bond part being made of a material having a high optical absorptance for laser beam; and (b) irradiating a laser beam on an area to be connected under a state that at least one of the wire rod and the substrate is being pulled toward the other.

2 Claims, 2 Drawing Sheets

Step (a)

Step (b)

Step (c)

Step (d)

METHOD FOR CONNECTING LEADER LINE

TECHNICAL FIELD

The present invention relates to a method for connecting a leader line, in particular, to a method for connecting a core wire of a wire rod of wire material pulled out from a coil component to a substrate such as a terminal by irradiating a laser beam.

BACKGROUND ART

In general, a method, which has been known as a method for connecting a core wire of a wire rod to a substrate such as a terminal, includes: winding a wire rod having an insulating coating formed on the periphery of the core wire around a substrate such as a terminal, followed by soaking the wire rod in a solder tub, removing the insulating coating from the wire rod by melting the insulating coating under the melting heat of the solder; and adhesion-fixing copper or the like, which is the core wire of the wire rod, to the substrate such as the terminal.

Miniaturization and operating environment of electronic apparatus have become severe in recent years. The operating environment of electronic components, such as a coil incorporated therein, has also become extremely severe. Therefore, the high heat resistance of the electronic component itself has been also requested simultaneously with miniaturization of electronic components. In order to respond to such demands, for example, there is no way to avoid the use of a wire having an insulating coating with high heat resistance on the periphery of its core wire and the use of a thin wire as a wire rod for the miniaturization of electronic components. However, when connecting a wire rod to a substrate such as a terminal, mechanical removal of an insulating coating tends to cause wire disconnection. On the other hand, in the case of removal of the insulating coating of a wire rod by melting with the melting heat of solder, there is a problem of difficulty in placing a miniaturized substrate into a solder tub.

In recent years, therefore, other methods have been proposed, where an insulating coating on the periphery of a core wire of a wire rod is delaminated therefrom by burning with laser beam irradiation, and simultaneously the core wire of the wire rod is connected to a substrate such as a terminal.

For instance, Japanese Laid-Open Patent Publication No. 3-155300 (JP 3-155300 A) discloses a method including: previously applying solder to a lead wire installed in a coil bobbin to form a solder layer; winding a wire rod around the lead wire, the wire rod being pulled out from a coil component and covered with an insulating coating; melting the solder layer portion by laser beam irradiation thereon; and burning an insulating coating with the melting heat of solder to remove the insulating coating, while connecting the wire rod to the lead wire. This method allows soldering operation to be flexible even if electronic components are miniaturized, compared with other conventional methods where soaking in a solder tub is employed for connection.

SUMMARY OF INVENTION

Technical Problem

However, the invention disclosed in JP 3-155300 A, a leader line from a coil is only wound around a lead wire which is provided with a solder layer by application of solder. Therefore, removal of the insulating coating and adhesion between the lead wire and the leader line from the coil are not always performed in a reliable manner even if performed by laser beam irradiation, resulting in problem in reliability.

Accordingly the present invention has been made in consideration of the aforementioned problem, and it is an object of the present invention to provide a method for connection of a leader line, which is able to remove an insulating coating from a wire rod pulled out from a coil component and ensure adhesive fixation between the core wire of the wire rod and a substrate.

Solution to Problem

Embodiments of the present invention have been proposed to attain the above object. One aspect of the present invention is a method for connecting a core wire of a wire rod covered with an insulating coating and pulled out from a coil component with a substrate, the method comprising the steps of: (a) forming a bond part between the wire rod and the substrate, the bond part being made of a material having a high optical absorptance for laser beam; and (b) irradiating a laser beam on an area to be connected under a state that at least one of the wire rod and the substrate is being pulled toward the other.

The bond part may be formed of a material containing at least tin.

The insulating coating may be colored blue or green.

Advantageous Effects of Invention

According to one aspect of the present invention, a wire rod is arranged on the substrate via the bond part formed of the material having a high optical absorptance for laser beam. A laser beam is then irradiated on an area to be connected between the bond part and the wire rod while force is applied so that at least one of the wire rod and the substrate is pulled toward the other. As a result, the bond part arranged between the wire rod and the substrate generates heat. The heat burns the insulating coating of the wire rod adhesively arranged on the bond part, and simultaneously melts the bond part. Subsequently, a core wire of the wire rod sinks into the bond part, and the periphery of the core wire is covered by the bond part. A series of these actions makes possible to remove the insulating covering from the wire rod and to adhesively fix the substrate on the core wire on the wire rod together, simultaneously. Consequently, these procedures can be easily performed with high accuracy.

DESCRIPTION OF EMBODIMENTS

Hereinafter, a mode for carrying out the invention (hereinafter, referred to as an "embodiment") will be described in detail with reference to the attached drawings.

Figure 1:
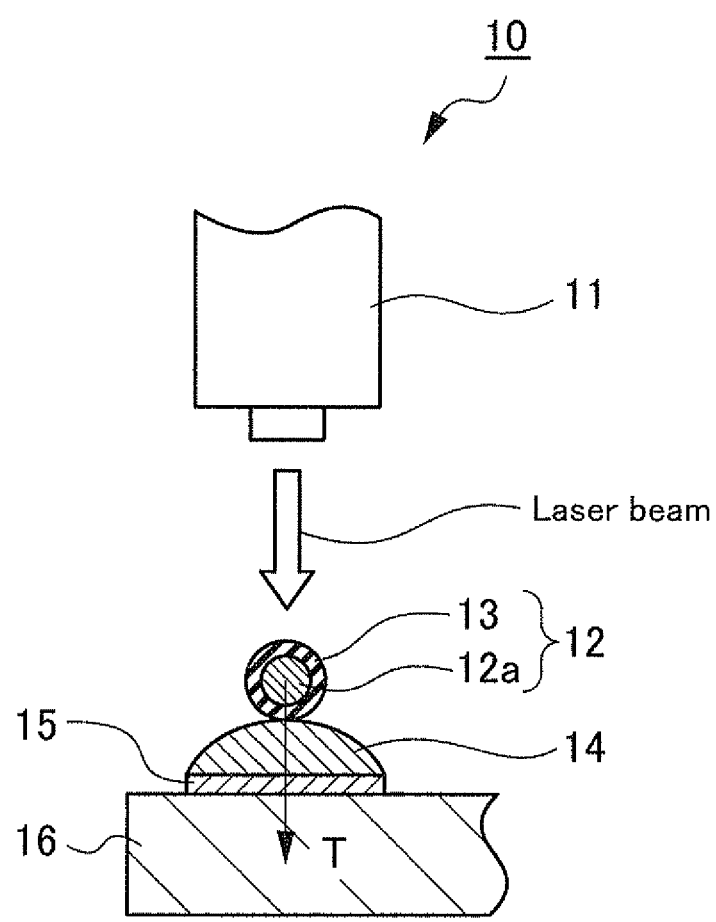
FIG. 1 is a cross-sectional diagram schematically illustrating a leader connector for carrying out a method for connecting a leader line according to one embodiment of the present invention.

FIG. 1 is a cross-sectional diagram schematically illustrating an exemplary leader connector for carrying out a method for connecting a leader line according to an embodiment of the preset invention. As depicted in FIG. 1, a leader connector 10 includes a laser beam irradiator 11 for irradiation of a laser beam. A printed circuit board 16 is placed under the laser beam irradiator 11. On the printed circuit board 16, a wire rod 12, which is pulled out from a coil component (not shown), and a substrate (such as a terminal formed as a wiring pattern or the like) 15, which is to be connected to the wire rod 12 via a bond part 14, are arranged. Here, for example, the printed circuit 16 may be a glass epoxy board. The substrate 15 may be formed by, for example, application of phosphor bronze or the like is applied to the print circuit board 16; or plating, coating, or printing of a conductive metal on any of other metals (e.g., materials such as plated tin, copper, silver, cadmium, and composites thereof).

The core rod 12 includes a conductive core wire 12a made of copper or the like. The periphery of the core wire 12a is covered with an insulating coating 13 made of polyurethane, polyimide, or the like.

The laser beam irradiator 11 is configured to irradiate a laser beam on the bond part 14 and keep the irradiation in a state that the wire rod 12 is pulled toward the bond part 13 (i.e., pulled toward the substrate 15) to place them under tension T.

Figure 2:
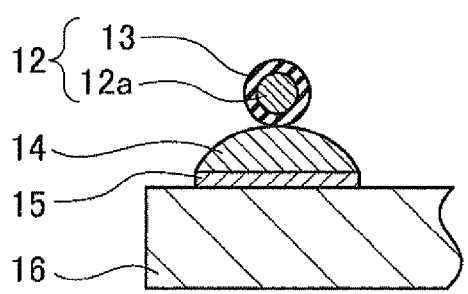
FIG. 2 is an explanatory diagram sequentially illustrating the steps of the method for connecting a leader line according to the embodiment of the present invention.
Figure 2:
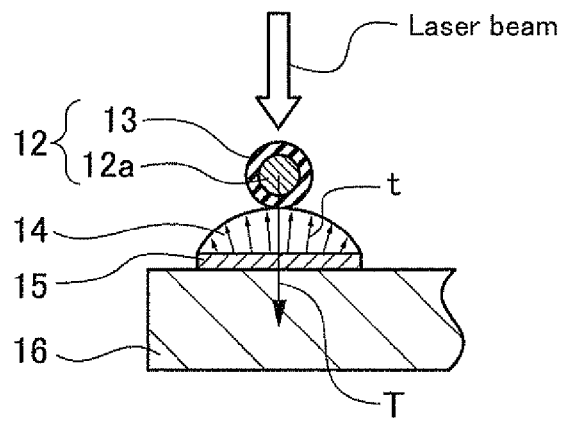
Figure 2:
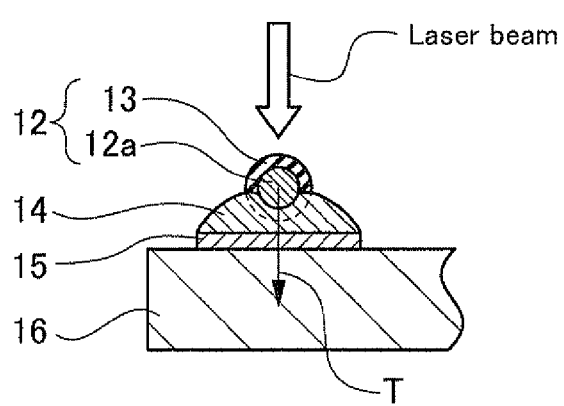
Figure 2:
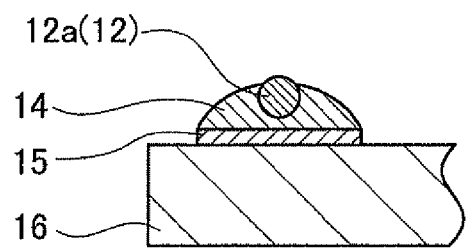

FIG. 2 is a diagram sequentially illustrating the steps of an exemplary connection method using the leader connector 10 depicted in FIG. 1. In the figure, the core wire 12a of the wire rod 12 pulled out from the coil component (not shown) is adhesion-fixed on the substrate 15 via the bond part 14. Hereafter, the connection steps (a) to (d) will be described in this order with reference to FIG. 2.

First, using a known coating technique or the like, the bond part 14 formed of a material having a high optical absorptance for laser beam is placed on the substrate 15 of the printed circuit board 16 (step (a)).

Next, under force that is tension T for pulling the wire rod 12, which has been pulled out from the coil component, toward the substrate 15, the wire rod 12 is placed on the bond part 14 on the substrate 15 and a laser beam is then irradiated on an area to be connected where the wire rod 12 and the substrate 15 are to be connected to each other via the bond part 14 (step (b)). In the figure, reference sign "t" denotes "reaction force" acting from the bond part 14 to the wire rod 12.

Tension T is applied so that the wire rod 12 can be pulled toward the substrate 15, while a laser beam is irradiated on the area to be connected. As a result, the bond part 14 absorbs the laser beam and generates heat. Subsequently, the heat burns out the insulating coating 13 of the wire rod 12, which is in contact with the bond part 14. Then, the core wire 12a is exposed and the bond part 14 starts to melt (step (c)).

The bond part 14 can be further softened by successively irradiating the laser beam on the bond part 14 while applying tension T so as to pull the wire rod 12 toward the substrate 15. Due the presence of reaction force t as well as tension T pulling the wire rod 12 toward the substrate 15, the core wire 12a of the wire rod 12, which faces the substrate 15, sinks into the bond part 14. Thus, the periphery of the core wire 12a is brought into a state of being covered with the bond part 14. After that, the laser beam irradiation is stopped to cool and solidify the bond part 14, completing the adhesion-fixing between the core wire 12a of the wire rod 12 and the substrate 15 (step (d)).

Therefore, by completing the above steps (a) to (d), the removal of the insulating coating 13 from the wire rod 12 and the adhesion-fixing between the core wire 12a and the substrate 15 while being kept in conductive state can be simultaneously attained. Therefore, the removal of the insulating coating 13 from the wire rod 12 and the adhesion fixing between the core wire 12a and the substrate 15 can be performed in a complete manner.

In summary, according to the present embodiment, the wire rod 12 is arranged on the substrate 15 via the bond part 14 formed of the material having a high optical absorptance for laser beam. A laser beam is then irradiated on the area to be connected while force is applied so that at least one of the wire rod 12 and the substrate 15 is pulled toward the other. Then, heat is generated from the bond part 14 which is formed by application or the like. The heat burns the insulating coating 13 arranged in close contact with the bond part 14, causing the core wire 12a of the wire rod 12 to be exposed. Simultaneously, the bond part 14 melts and becomes soft. Since the core wire 12a of the wire rod 12 is pulled toward the substrate 15, the core wire 12a of the wire rod 12, which faces the substrate 15, sinks into the bond part 14. Thus, the periphery of the core wire 12a is brought into a state of being covered with the bond part 14. A series of these actions makes possible to remove the insulating coating 13 from the wire rod 12 and to adhesively fix the core wire 12a and the substrate 15 together while being kept in conductive state can be simultaneously attained.

The bond part 14 may be formed of any material as long as it is easy to absorb laser beams. Among the materials, for example, it may be formed of only tin or a tin-containing material.

Tin is applicable to soldering while having a high optical absorptance for laser beam. Therefore, removal of the insulating coating 13 from the wire rod 12 and adhesive fixing between the core wire 12a and the substrate 15 can be much more easily performed with high accuracy.

The laser beam may be any of beams of solid state laser, gas laser, and liquid laser, or more specifically, for example, any of beams of carbon dioxide gas laser, semiconductor laser, excimer laser, and YAG laser.

In this embodiment, with respect to an area on which a laser beam is directly irradiated on the insulating coating 13, it is preferable that the wire rod 12 to be used may have a blue- or green-colored insulating coating 13 to facilitate removal of the insulating coating 13. Alternatively, any of other colors, such as natural color (daytime color) may be applicable.

The use of blue- or green-colored insulating coating 13 facilitates removal of the insulating coating 13 more easily by allowing the insulating film 13 being separated during the laser beam irradiation.

In the above description, the bond part 14 has been described as one being formed by application or the like on the substrate 15. Alternatively, however, it may be applied to the periphery of the wire rod 12 or may be applied to both the substrate 15 and the wire rod 12.

In the above description, tension T has been described as one for pulling the wire rod 12 toward the substrate 15. Conversely, tension T may be applied for pulling the substrate 15 toward the wire rod 12.

The scope of the present invention is not limited to the above embodiment. It goes without saying that the present invention can be implemented in various modified modes without departing from the gist of the present invention.

The invention claimed is:

1. A method for connecting a core wire of a wire rod covered with an insulating coating in natural color, wherein the natural color comprises daytime color, and pulled out from a coil component with a substrate by irradiating a laser beam, the method comprising the steps of:
   (a) forming a bond part between the wire rod and the substrate, the bond part being made of a material having a high optical absorptance for laser beam; and (b) irradiating a laser beam on an area to be connected under a state that at least one of the wire rod and the substrate is being pulled toward the other.

2. The method according to claim 1, wherein the bond part is formed of a material containing at least tin.

\* \* \* \* \*